US008582876B2

(12) United States Patent
Shen et al.

(10) Patent No.: US 8,582,876 B2
(45) Date of Patent: Nov. 12, 2013

(54) HYBRID CODEC FOR COMPOUND IMAGE COMPRESSION

(75) Inventors: Huifeng Shen, Beijing (CN); Zhaotai Pan, Anhui (CN); Yan Lu, Beijing (CN); Shipeng Li, Beijing (CN)

(73) Assignee: Microsoft Corporation, Redmond, WA (US)

( * ) Notice: Subject to any disclaimer, the term of this patent is extended or adjusted under 35 U.S.C. 154(b) by 93 days.

(21) Appl. No.: 13/296,455

(22) Filed: Nov. 15, 2011

(65) Prior Publication Data

US 2013/0121573 A1 May 16, 2013

(51) Int. Cl.
*G06K 9/36* (2006.01)
(52) U.S. Cl.
USPC .......................................... 382/166; 382/176
(58) Field of Classification Search
None
See application file for complete search history.

(56) References Cited

U.S. PATENT DOCUMENTS

| 5,327,509 | A | * | 7/1994 | Rich | 382/108 |
|---|---|---|---|---|---|
| 5,333,212 | A | | 7/1994 | Ligtenberg | |
| 6,385,336 | B1 | * | 5/2002 | Jin | 382/162 |
| 6,411,730 | B1 | * | 6/2002 | Bartell et al. | 382/168 |
| 6,597,811 | B1 | | 7/2003 | Batkilim et al. | |
| 7,302,107 | B2 | | 11/2007 | Ahmed et al. | |
| 7,415,158 | B1 | | 8/2008 | O'Neill | |
| 7,903,873 | B2 | | 3/2011 | Lu et al. | |
| 2002/0097411 | A1 | * | 7/2002 | Roche et al. | 358/1.9 |
| 2003/0133617 | A1 | * | 7/2003 | Mukherjee | 382/239 |
| 2004/0101194 | A1 | * | 5/2004 | Dawson | 382/162 |
| 2005/0244065 | A1 | | 11/2005 | Malvar et al. | |
| 2007/0009179 | A1 | * | 1/2007 | Easwar | 382/276 |
| 2007/0140559 | A1 | | 6/2007 | Rambharack et al. | |
| 2007/0201751 | A1 | * | 8/2007 | Wu et al. | 382/232 |
| 2008/0196076 | A1 | * | 8/2008 | Shatz et al. | 725/116 |
| 2008/0256467 | A1 | * | 10/2008 | Chu et al. | 715/762 |
| 2009/0074307 | A1 | * | 3/2009 | Lu et al. | 382/232 |
| 2010/0111410 | A1 | | 5/2010 | Lu et al. | |
| 2012/0189199 | A1 | * | 7/2012 | Berent | 382/166 |

OTHER PUBLICATIONS

Lin, et al. "Compound Image Compression for Real-Time Computer Screen Image Transmission", IEEE Transactions on Image Processing, vol. 14, No. 8, Aug. 2005, pp. 993-1005.

\* cited by examiner

*Primary Examiner* — Barry Drennan
*Assistant Examiner* — Feng Niu
(74) *Attorney, Agent, or Firm* — Lee & Hayes, PLLC

(57) ABSTRACT

One or more portions of a compound image may be classified as picture portions and at least one remaining portion of the compound image may be classified as a non-picture portion. A first layer of a layered image may be generated based on the picture portions of the compound image. The first layer may be compliant with a first image format. A second layer of the layered image may be generated based on the non-picture portion. The second layer may be compliant with a second image format that is different from the first image format. The first layer and the second layer may be sent to a web browser. The first format and the second format may be supported by the web browser.

20 Claims, 11 Drawing Sheets

HYBRID CODEC FOR COMPOUND IMAGE COMPRESSION

BACKGROUND

Different types of images, such as posters, documentation images and advertisement images, may be available on the web (e.g., the Internet). These images may include one or more of text, graphics (e.g., computer generated graphics), and pictures (e.g., natural images). An image that includes one or more pictures and includes text, graphics, or both may be referred to as a compound image.

However, compressing a compound image to enable a web browser to display the compressed image with clarity may be difficult to achieve. For example, a compression format that enables text or graphics to be displayed clearly may not display pictures clearly while a compression format that enables pictures to be displayed clearly may not display text or graphics clearly.

SUMMARY

This Summary is provided to introduce a selection of concepts in a simplified form that are further described below in the Detailed Description. This Summary is not intended to identify key or essential features of the claimed subject matter; nor is it to be used for determining or limiting the scope of the claimed subject matter.

Implementations disclosed herein provide techniques and arrangements to compress compound images. For example, one or more portions of a compound image may be classified as picture portions and at least one remaining portion of the compound image may be classified as a non-picture portion. A first layer of a layered image may be generated based on the picture portions of the compound image. The first layer may be compliant with a first image format. A second layer of the layered image may be generated based on the non-picture portion. The second layer may be compliant with a second image format that is different from the first image format. The first layer and the second layer may be sent to a web browser. The first format and the second format may be supported by the web browser.

BRIEF DESCRIPTION OF THE DRAWINGS

The detailed description is set forth with reference to the accompanying drawing figures. In the figures, the left-most digit(s) of a reference number identifies the figure in which the reference number first appears. The use of the same reference numbers in different figures indicates similar or identical items or features.

DETAILED DESCRIPTION

Compressing Compound Images

Figure 1:
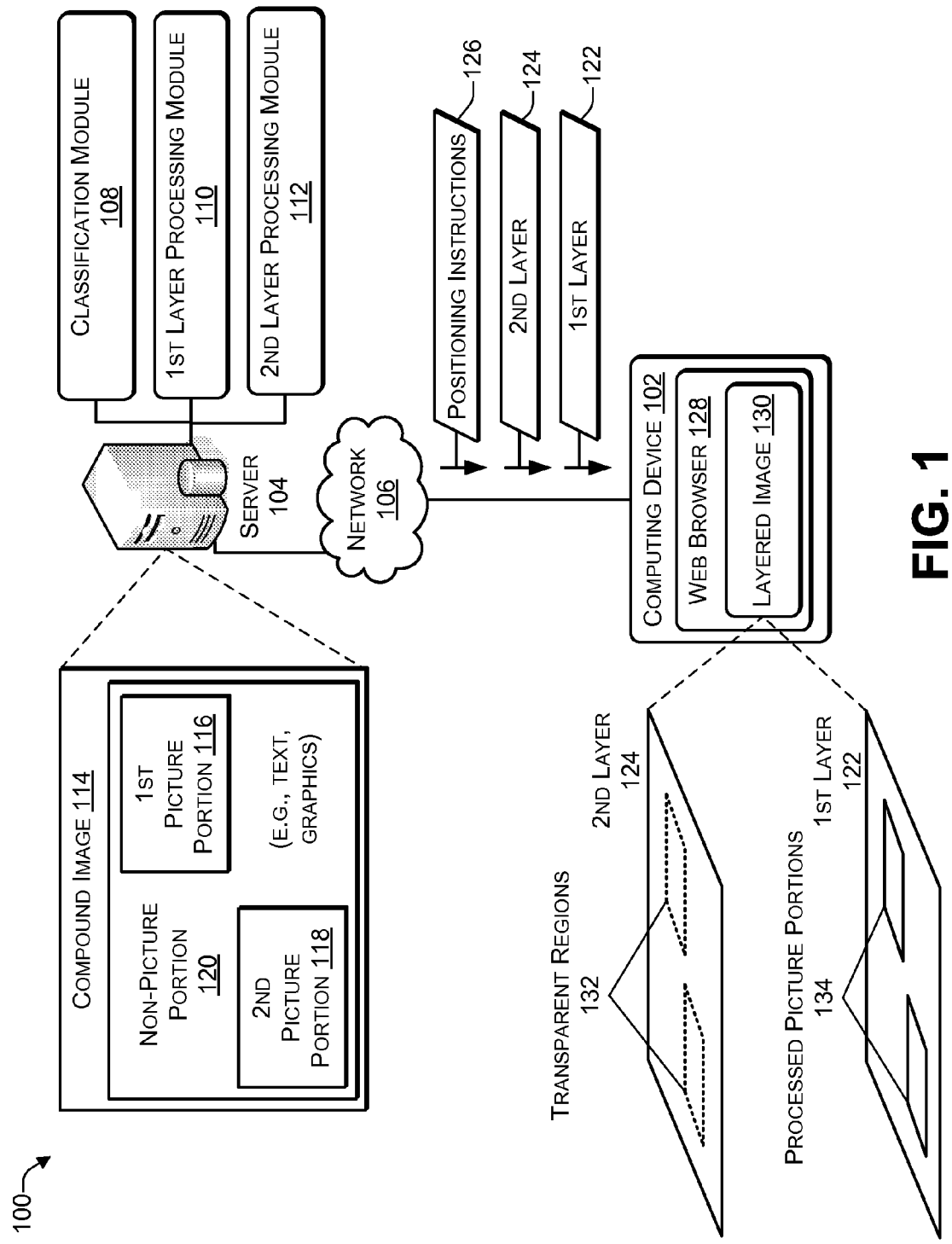
FIG. 1 illustrates an example framework for compressing a compound image according to some implementations.

Most browsers natively support, e.g., without installing an additional coder/decoder (codec), images compliant with a joint picture experts group (JPEG) standard and a portable network graphics (PNG) standard. JPEG may provide good compression efficiency with pictures but is not well suited for non-picture content with sharp contrasts, such as text or graphics. In contrast, PNG may perform well with content that has sharp contrasts, but is not well suited for pictures (e.g., content with gradual transitions).

One approach to compressing compound images may be to encode a web page in either PNG or JPEG depending on whether the web page is predominantly text/graphics or predominately pictures. However, this solution results in the non-predominant portions of the web page being presented in a format that is less than ideal. Other approaches may include using a compression scheme to create a processed image in a format that web browsers do no natively support, thereby requiring installation of an add-on codec to display the processed image. The term "natively supports" as used herein means that when a web browser natively supports a particular format, the codec to present the particular format for viewing is included in the web browser as originally installed. Thus, the web browser does not require installation of an add-on codec to enable the web browser to present the particular format for viewing.

The approach described herein extracts the picture portions and the non-picture portions from a compound image. The picture portions are compressed using a first type of encoding scheme to generate a first layer. The non-picture portions are compressed using a second type of encoding scheme to generate a second layer. The first layer and the second layer are sent to the web browser. The web browser natively supports both the first type of encoding scheme and the second type of encoding scheme. For example, the first type of encoding scheme may be JPEG while the second type of encoding may be PNG. The web browser creates a layered image corresponding to the compound image by overlaying the second layer over the first layer. The layered image may achieve a compression ratio that is between two and four times as efficient as either JPEG or PNG. The smaller size of the layered image may be used to present preview images of web pages that include compound images to a web browser. The smaller size of the layered image may enable faster transmission of the preview images as compared to transmitting the compound images.

The technologies described herein generally relate to compressing compound images to create a compressed image that a web browser is capable of displaying. A compound image may be divided into a plurality of blocks. The implementations may provide techniques to classify a first set of blocks from the plurality of blocks as picture blocks and to classify a second set of blocks from the plurality of blocks as non-picture block. A first layer of a layered image may be generated based on the first set of blocks. The first layer of the layered image may have a first format. A second layer of the layered image may be generated based on the second set of blocks. The second layer of the layered image may have a second format that is different from the first format. The first layer and the second layer may be sent to a web browser capable of natively (e.g., without installing any additional codecs) displaying the first format and the second format.

In some cases, the entire compound image may be classified as a picture portion. In these cases, the second layer does not contain any content and is therefore completely transparent.

Some instances may classify one or more portions of a compound image as picture portions and may classify at least one remaining portion of the compound image as a non-picture portion. A first layer of a layered image may be generated based on the picture portions of the compound image. The first layer may be compliant with a first image format. A second layer of the layered image may be generated based on the non-picture portion. The second layer may be compliant with a second image format that is different from the first image format. The first layer and the second layer may be sent to a web browser capable of presenting the second layer as an overlay to the first layer to create the layered image.

Additionally, some implementations may divide a compound image into a plurality of blocks. One or more blocks of the plurality of blocks may be classified as picture blocks. At least one block of the plurality of blocks may be classified as a non-picture block. A first layer of a layered image may be generated based on the one or more picture blocks. The first layer may have a lossy image format. A second layer of the layered image may be generated based on the at least one non-picture block. The second layer may have a lossless image format. The first layer and the second layer may be sent to a browser that natively supports both the lossy image format and the lossless image format.

Compound Image Compression Framework

FIG. 1 illustrates an example of a framework 100 for compressing a compound image according to some implementations. The framework 100 includes a computing device 102 coupled to a server 104 via a network 106.

The computing device 102 may be a personal computer, a laptop, a netbook, a tablet computing device, a personal digital assistant, a wireless phone, another type of computing device, or any combination thereof The computing device 102 may include a memory device to store instructions and one or more processors capable of executing the instructions to perform various functions. For example, the computing device 102 may enable a user to browse websites that include compound images. The websites may be part of the internet (e.g., public websites), part of a private network (e.g., intranet or extranet), part of another type of network, or any combination thereof.

The server 104 may include modules to provide network-based (e.g., cloud-based) services, such as a search engine, a portal, and the like. The modules may include a classification module 108, a first layer processing module 110, and a second layer processing module 112. The server 104 may include a memory and one or more processors. The modules may be stored in memory of the server 104. The modules may include instructions that are executable by the one or more processors to perform various functions as described herein.

The network 106 may include one or more networks, including a private network, a public network, another type of network, or any combination thereof The one or more networks may use different types of communication technologies, including but not limited to wireless technologies (e.g., code division multiple access (CDMA), global system for mobile (GSM), universal mobile telephone service (UMTS), WiFi®, WiMax®, and the like), wireline technologies (e.g., Ethernet, X.25, asynchronous transfer mode (ATM), synchronous optical network (SONET), and the like), other types of communication technologies, or any combination thereof In operation, the server 104 may identify a compound image 114 to send to the computing device 102. For example, the compound image 114 may be identified in response to a network search request or a network browse request from the computing device 102. The compound image 114 may include one or more picture portions, such as first picture portion 116 and a second picture portion 118. The one or more picture portions 116 and 118 may include natural images, such as digital pictures taken using a camera or other image capture device. The compound image may include at least one non-picture portion 120. The non-picture portion 120 may include text, graphics (e.g., computer-generated graphics), line art, or any combination thereof In general, the picture portions 116 and 118 may have relatively low-contrast transitions while the non-picture portion 120 may have relatively higher contrast transitions.

The classification module 108 may process the compound image 114 to identify the picture portions 116 and 118 and the non-picture portion 120. For example, the classification module 108 may divide the compound image 114 into blocks (e.g., sixteen pixels by sixteen pixels blocks), examine each block, and classify each block as part of the picture portions 116 and 118 or the non-picture portion 120 of the compound image 114.

The classification module 108 may provide the blocks identified as the picture portions 116 and 118 to the first layer processing module 110. The first layer processing module 110 may process (e.g., compress) the picture portions 116 and 118 to generate a first layer 122. The first layer 122 may include one or more processed picture portions 134 that correspond to the picture portions 116 and 118 of the compound image 114. For example, the one or more processed picture portions 134 may be compressed versions of the picture portions 116 and 118. The classification module 108 may provide the blocks identified as the non-picture portion 120 to the second layer processing module 112. The second layer processing module 112 may process (e.g., compress) the non-picture portion 120 to generate a second layer 124. The second layer 124 may include one or more transparent regions 132. The server 104 may send the first layer 122 and the second layer 124 to the web browser 128. In some implementations, the first layer 122 may be in a first format (e.g., JPEG) and the second layer 124 may be in a second format (e.g., PNG). The web browser 128 may natively support displaying both the first format and the second format, e.g., the web browser 128 may be capable of displaying the first layer 122 and the second layer 124 without installing an external add-on coder/decoder (codec).

In some implementations, the web browser 128 may use default positioning rules that are built-in to the browser to overlay the second layer 124 over the first layer 122. In other implementations, the server 104 may send positioning instructions 126 to the web browser 128. The positioning instructions 126 may instruct the web browser on positioning the second layer 124 over the first layer 122. In some implementations, the positioning instructions 126 may be provided in the form of a scripting language, such as Javascript®.

After receiving the first layer 122 and the second layer 124 from the server 104, the web browser 128 may overlay the second layer 124 over the first layer 122 to create a layered image 130. The web browser 128 may position the second layer 124 over the first layer 122 based on the positioning instructions 126 or based on default positioning rules. Positions the transparent regions 132 in the second layer 124 may correspond to positions of the processed picture portions 134 to enable the processed picture portions 134 of the first layer 122 and the non-transparent regions of the second layer 124 to be viewed in the layered image 130. Thus, the layered image 130 displayed by the web browser 128 may correspond to the compound image 114, with the first layer 122 corresponding to the picture portions 116 and 118 of the compound image 114 and the second layer 124 corresponding to the non-picture portion 120 of the compound image 114.

By compressing the compound image 114, a size of the layered image 130 may be smaller than a size of the compound image 114. For example, the layered image 130 may be between two and four times smaller than the compound image 114 while providing a quality (e.g., as measured by a peak signal-to-noise ratio) that is comparable to the compound image 114. By sending the layers 122 and 124 instead of the compound image 114, bandwidth utilization of the network 106 may be reduced. In addition, a latency associated with responding to a request to display (e.g., preview) the compound image 114 at the web browser 128 may be reduced.

Thus, the picture portions 116 and 118 of the compound image 114 may be identified and compressed to create the first layer 122. The non-picture portion 120 of the compound image 114 may identified and compressed to create the second layer 124. The first layer 122 and the second layer 124 may be sent to the web browser 128 when the compound image 114 is requested by the web browser 128. The smaller size of the layered image 130 created by overlaying the second layer 124 over the first layer 122 may reduce the bandwidth usage of the network 106 and reduce the latency associated with responding a request for the compound image 114. By using formats (e.g., JPEG and PNG) for the layers 122 and 124 that are natively supported by the web browser 128, the web browser 128 may present the layered image 130 for viewing without installation of an add-on codec.

Compound Image Compression Framework

Figure 2:
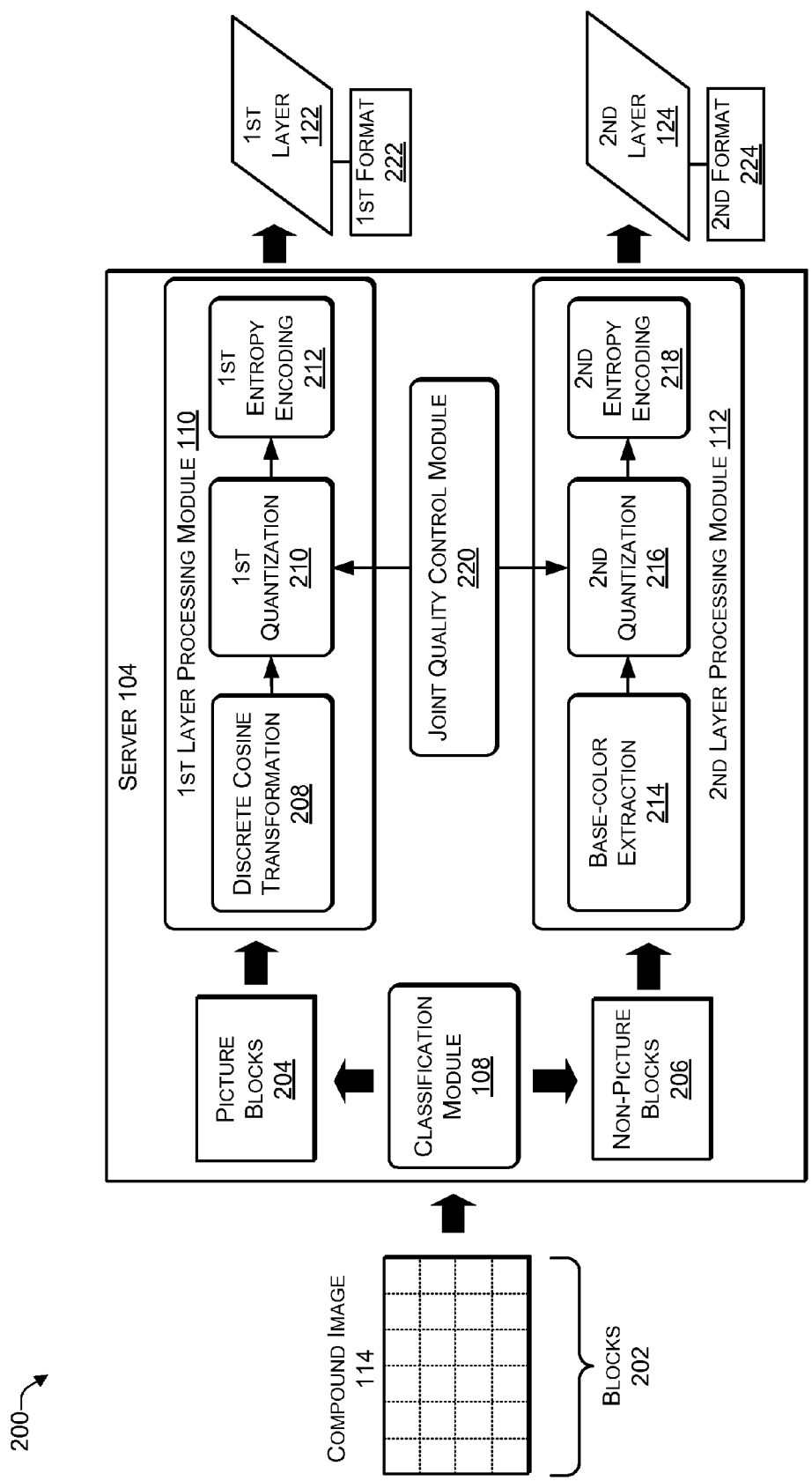
FIG. 2 illustrates an example framework for compressing a compound image according to some implementations.

FIG. 2 illustrates an example of a framework 200 for compressing a compound image according to some implementations.

The classification module 108 may divide the compound image 114 into multiple blocks 202. For example, each of the multiple blocks 202 may have a pre-determined size, such as 4×4 pixels, 8×8 pixels, 16×16 pixels, and the like. In some implementations, each block may have a size of no greater than 16×16 pixels (e.g., 256 pixels). The size of each of the multiple blocks 202 may be selected based on various criteria, such as image quality, processing time, another criteria, or any combination thereof For example, when faster previewing is requested, a larger block size may be selected. When higher quality is requested, a smaller block size may be selected.

The classification module 108 may classify each of the blocks 202 based on pixel information associated with each block, as described below. The pixel information may include one or more of a number of base-color pixels, a distribution of pixel gradients, and a block boundary smoothness of each pixel. Based on the pixel information, the classification module 108 may classify one or more of the blocks 202 as picture blocks 204 and classify one or more of the blocks 202 as non-picture blocks 206.

The first layer processing module 110 may process the picture blocks 204 to generate the first layer 122. A transform-based coding mechanism may be used to encode (e.g., compress) the picture blocks 204 because energy in a transform domain may be concentrated at low frequencies. For example, a lossy compression format, such as JPEG, may be used to compress the picture blocks 204. As illustrated in FIG. 2, the first layer processing module 110 may perform one or more of a discrete cosine transform 208, a first quantization 210, or a first entropy encoding 212 to encode the picture blocks 204 to generate the first layer 122. The first entropy encoding 212 may encode the first layer 122 in a first format 222 (e.g., JPEG format).

In the non-picture blocks 206, energy in a pixel domain may be concentrated in several colors or in a small range around several colors. For this reason, a pixel-domain encoding, such as PNG, may be used to encode the non-picture blocks 206. However, as PNG is a lossless encoding, the second quantization 216 may perform a pixel-domain quantization of the non-picture blocks 206 prior to the second entropy encoding 218. For example, a lossless data compression algorithm, such as deflate, may be used to compress the non-picture blocks 206 prior to the second entropy encoding.

As illustrated in FIG. 2, the second layer processing module 112 may perform one or more of a base-color extraction 214, a second quantization 216, and a second entropy encoding 218 to generate the second layer 124. The second entropy encoding 218 may encode the results of the second quantixation 216 using a lossless encoding, such as PNG. The second layer 124 may be encoded in a second format 224 that is different from the first format 222. If the classification module 108 extracts base-colors for each of the blocks 202, the base-color extraction 214 may re-use the extracted base-colors.

The first quantization 210 and the second quantization 216 may be different quantization mechanisms. For example, the first quantization 210 may be suited for the picture blocks 204 (e.g., natural images) while the second quantication 216 may be suited for the non-picture blocks 206 (e.g., text or graphics). A joint quality control module 220 may be used to balance results of the first quantization 210 and results of the second quantization 216. The joint quality control 220 module may be used to enable a quality of the second quantization 216 to approximate a quality of the results of the first quantization 210.

To enable the web browser 128 to natively support display of the layered image 130, two separate layers (e.g., streams) may be generated, with each layer encoded using a different format. The first layer 122 may include a JPEG stream that includes the picture blocks 204. The second layer 124 may include a PNG stream that includes the non-picture blocks 206. Because the PNG format supports transparency, the second layer 124 may include the transparent regions 132 that enable the processed picture portions 134 to be viewed after the second layer 124 is overlayed over the first layer 122.

The web browser 128 may natively support decoding both the first layer 122 (e.g., the JPEG stream) and the second layer 124 (e.g., the PNG stream). By appropriately positioning the second layer 124 over the first layer 122, the transparent regions 132 in the second layer 124 enable the encoded picture blocks 204 in the first layer 122 to be visible. As a result, the layered image 130 corresponding to the compound image 114 can be displayed by the web browser 128.

Thus, the compound image 114 may be divided into the blocks 202. Each of the blocks 202 may be classified as one of the picture blocks 204 or as one of the non-picture blocks 206. The picture blocks 204 may be processed by the first layer processing module 110 to generate the first layer 122 in the first format 222 (e.g., JPEG). The non-picture blocks 206 may be processed by the second layer processing module 112 to create the second layer 124 in the second format 224 (e.g., PNG). The first format 222 and the second format 224 may be natively supported by the web browser 128, enabling the web browser 128 to overlay the second layer 124 over the first layer 122. The layered image 130 formed using the first layer 122 and the second layer 124 may be significantly smaller in size than the compound image 114. For example, when the second quantization 216 is set to a 40 decibel (db) peak signal-to-noise ratio that provides near lossless quality, the second layer 124 may have a compression ratio that is between twice and four times that of a standard PNG encoding. The first layer 122 may outperform standard JPEG encoding by up to 20 db, depending on the amount of images in the compound image 114.

Base-Color Pixel Distribution Examples

Figure 3:
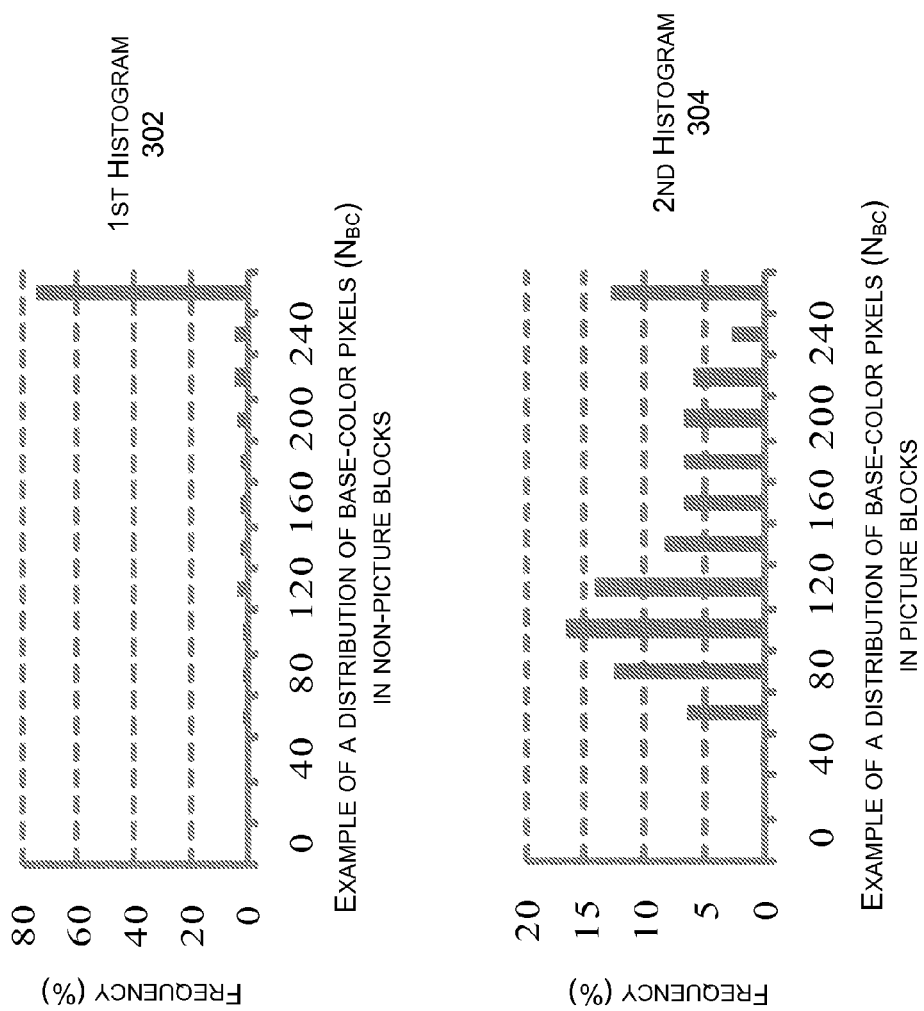
FIG. 3 illustrates examples of distributions of base-color pixels according to some implementations.
Figure 4:
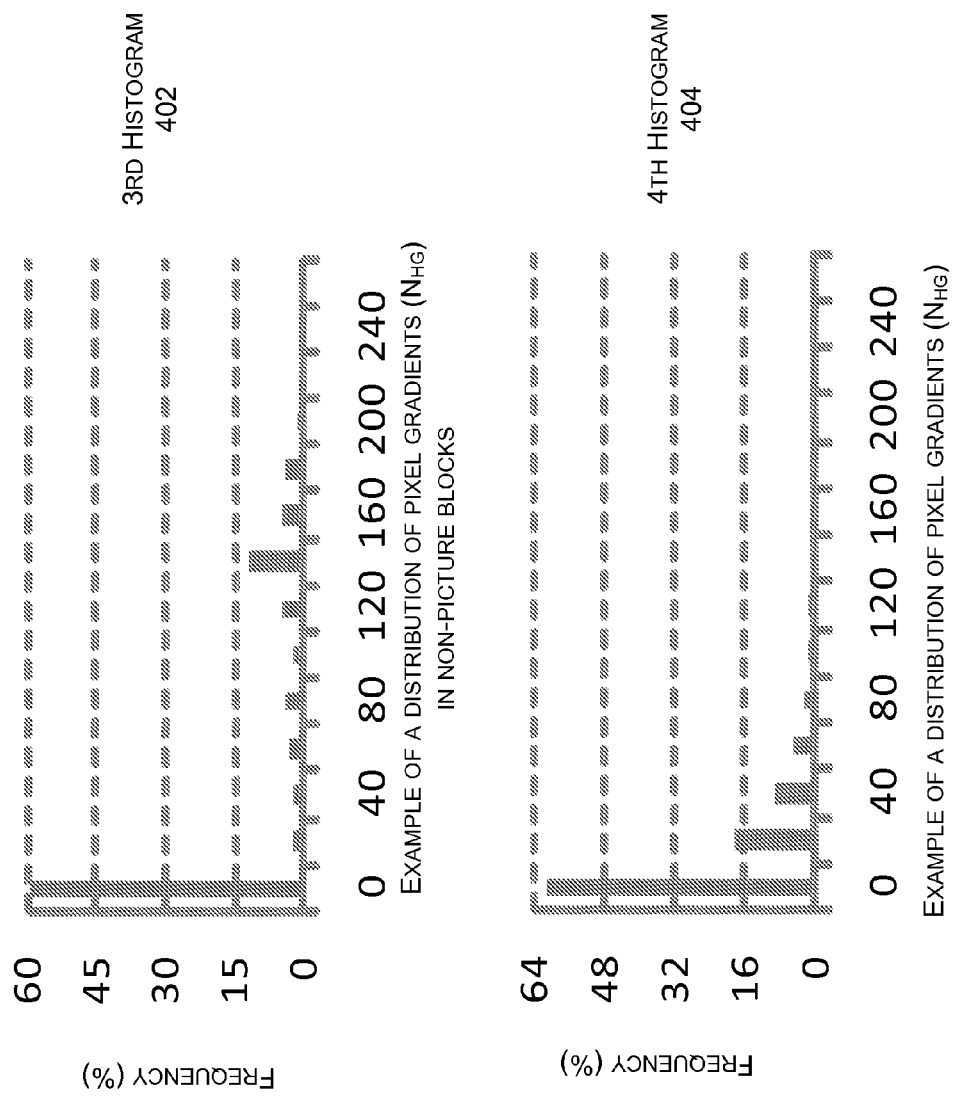
FIG. 4 illustrates examples of distributions of pixel gradients according to some implementations.
Figure 5:
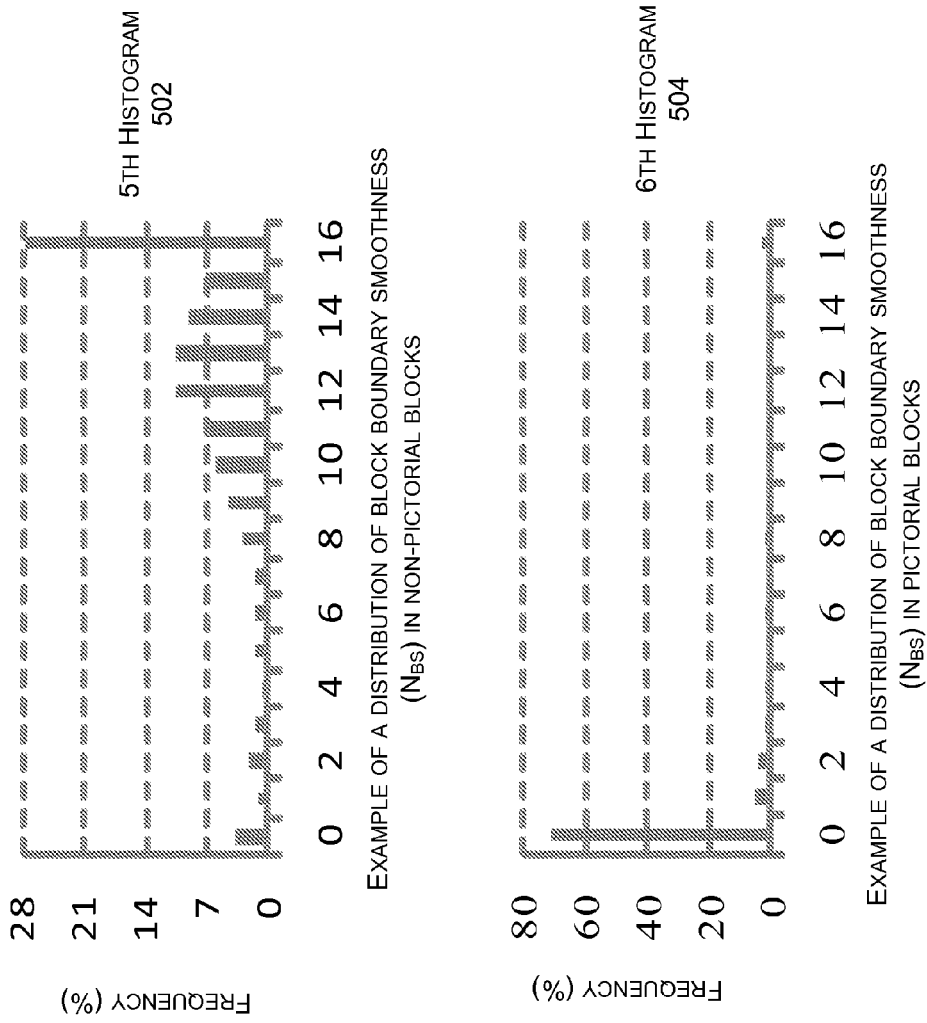
FIG. 5 illustrates examples of distributions of block boundary smoothness according to some implementations.

FIGS. 3, 4, and 5 illustrate examples of distributions of base-color pixels according to some implementations. The classification module 108 may classify each of the blocks 202 based on information associated with pixels in each of the blocks 202.

FIG. 3 illustrates distributions of base-color pixels in picture blocks and non-picture blocks. One block characteristic that may be used for classifying a particular block of the blocks 202 as a picture block or a non-picture block is the number of pixels in the particular block that are covered by base-colors. Base-colors are colors that occur most frequently relative to other colors in a particular block. A block that includes text, computer graphics, or other high contrast data typically has relatively few (e.g., no more than five) base-colors, as illustrated by first histogram 302. A block that includes pictures (e.g., natural images) typically has a higher number of base-colors, as illustrated by second histogram 304.

Base-colors may be extracted and a window may be applied around the base colors. For example, each window may have a fixed width, such as two pixels, four pixels, or eight pixels. The height of each window may be one or more pixels. The histograms 302 and 304 are a result of selecting a window width of four pixels. The number of pixels covered by the base-color windows in non-picture blocks is shown in the first histogram 302 and the number of pixels covered by the base-color windows in picture blocks is shown in the second histogram 304. The histograms 302 and 304 illustrate that picture blocks may have a relatively broad distribution of base-color pixels as compared to non-picture blocks. Thus, a high number of base-color covered pixels, denoted as $N_{BC}$, may be considered a necessary condition to classify a block as a non-picture block. However, this condition may not be a sufficient condition because some picture blocks may also have a high $N_{BC}$. Therefore, in addition to the number of base-color pixels, other statistical information, such as pixel gradients and block-boundary smoothness, may be used by the classification module 108 to classify the blocks 202.

FIG. 4 illustrates a distribution of pixel gradient values, denoted $N_{HG}$, in picture blocks and in non-picture blocks. Another block characteristic that may be used to classify a particular block of the blocks 202 as a picture block or a non-picture block is pixel gradients. A pixel gradient is change in an intensity or color in an image. A block that includes text, computer graphics, or other high contrast data typically has a relatively broad distribution of pixel gradients, as illustrated by third histogram 402. A block that includes pictures (e.g., natural images) typically has a relatively narrow distribution of pixel gradients, as illustrated by fourth histogram 404.

The fourth histogram 404 illustrates that in picture blocks, the pixel gradients $N_{HG}$ may be concentrated in low and medium gradient values, whereas for non-picture blocks, the pixel gradients $N_{HG}$ may be concentrated in low and high gradient values. Thus, for example, the classification module 108 may classify a particular block as a text block when a number of pixels with high gradients $N_{HG}$ in the particular block satisfy a particular threshold.

FIG. 5 illustrates a distribution of block boundary smoothness, denoted $N_{BS}$, in picture blocks and in non-picture blocks. Another block characteristic that may be used to classify a particular block of the blocks 202 as a picture block or a non-picture block is block boundary smoothness. Block-boundary smoothness, denoted $N_{BS}$, may represent a number of pixels which lie on a block boundary and that have a same color as a neighboring pixel in a neighboring block. A block that includes text, computer graphics, or other high contrast data typically has a relatively high block boundary smoothness, as illustrated by fifth histogram 502. A block that includes pictures (e.g., natural images) typically has a relatively low block boundary smoothness, as illustrated by sixth histogram 504.

The classification module 108 may use one or more of the base-color distribution $N_{BC}$, the pixel gradient distribution $N_{HG}$, and the boundary smoothness $N_{BS}$ to classify the blocks 108. For example, an exemplary classification algorithm may be formulated as:

$$f = u(N_{BC}, T_1) \times (u(N_{HG}, T_2) + u(N_{BS}, T_3)) \tag{1}$$

where $u(x, y)$ is defined as:

$$u(x, y) = \begin{cases} 1 & x \geq y \\ 0 & x < y, \end{cases} \tag{2}$$

and where $T_1$, $T_2$ and $T_3$ are pre-defined thresholds. Using this formula, the classification module 108 may classify a block from the blocks 202 as a picture block if f equals 0. Otherwise (e.g., if f is not equal to 0), the classification module 108 may classify the block from the blocks 202 as a non-picture (e.g., textual or graphic) block.

Quantization For Non-Picture Blocks

Figure 6:
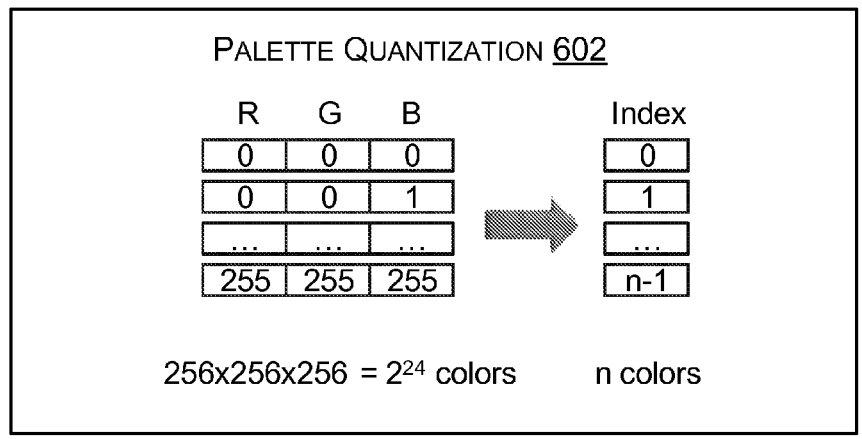
FIG. 6 illustrates examples of quantization according to some implementations.
Figure 6:
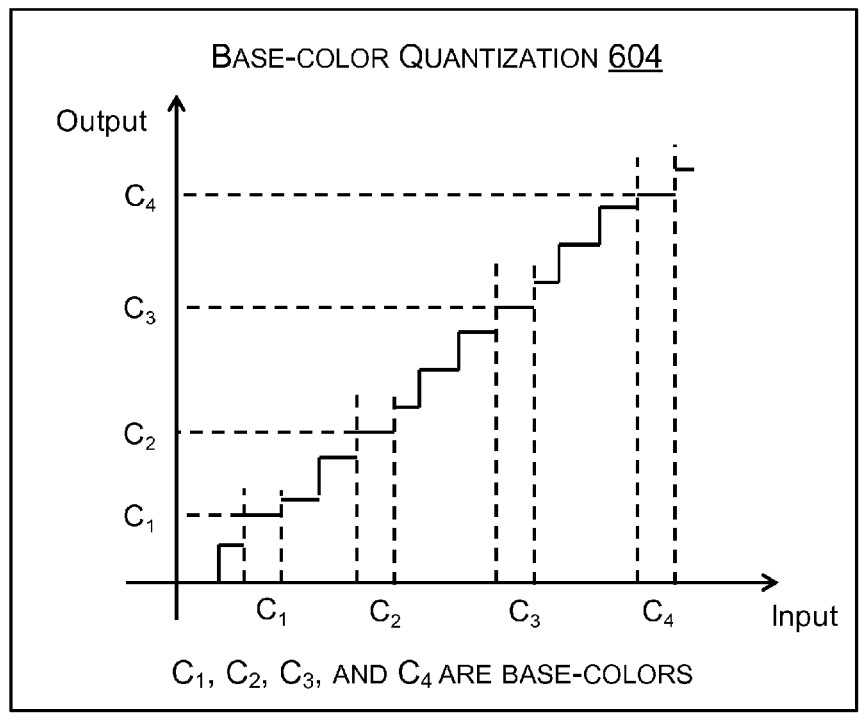

FIG. 6 illustrates examples of quantization according to some implementations. The second quantization 216 may quantize non-picture blocks 206 using a pixel-domain quantization mechanism before performing the second entropy encoding 218 (e.g., PNG encoding).

One quantization mechanism associated with PNG is palette quantization 602 because PNG supports palette-indexed colors. In the palette quantization 602, the colors in one or more of the non-picture blocks 206 may be quantized to a smaller palette (e.g., a number of colors), such as 256 colors. For example, a median cut algorithm may be used to perform the palette quantization 602 to significantly reduce a size of the second layer 124 as compared to the non-picture blocks 206 or the non-picture portion 120. However, due to the constraints of the smaller palette, the palette quantization 602 may not be suitable for producing a very high quality result. Therefore, the palette quantization 602 may be used when a bit-rate of the non-picture blocks 206 is relatively low. In other words, when the non-picture blocks 206 have a relatively low bit-rate, the quality of the non-picture blocks may be relatively poor. Performing the palette quantization 602 may not adversely affect the quality of relatively low bit-rate blocks.

For higher bit-rates, a base-color quantization 604 may be used for one or more of the non-picture blocks 206 textual blocks. In the base-color quantization 604, colors in a particular block whose distance from a base-color is smaller than a specified quantization step may be quantized to the base-color, while other colors may be quantized linearly.

The base-color quantization 604 may generate a smaller error than the palette quantization 602, resulting in a higher bit-rate result than the palette quantization 602. In some implementations, the base-color quantization 604 or the palette quantization 602 may be selected as the second quantization 216 based on a user selected quality setting. For example, the base-color quantization 604 may be selected to perform the second quantization 216 when the user has selected a high quality setting. The palette quantization 602 may be selected to perform the second quantization 216 when the user has not selected the high quality setting or has selected a lower quality setting. In some implementations, the second quantization 216 may perform either the base-color quantization 604 or the palette quantization 602 based on a bit-rate of the non-picture blocks 206.

Example Processes

Figure 7:
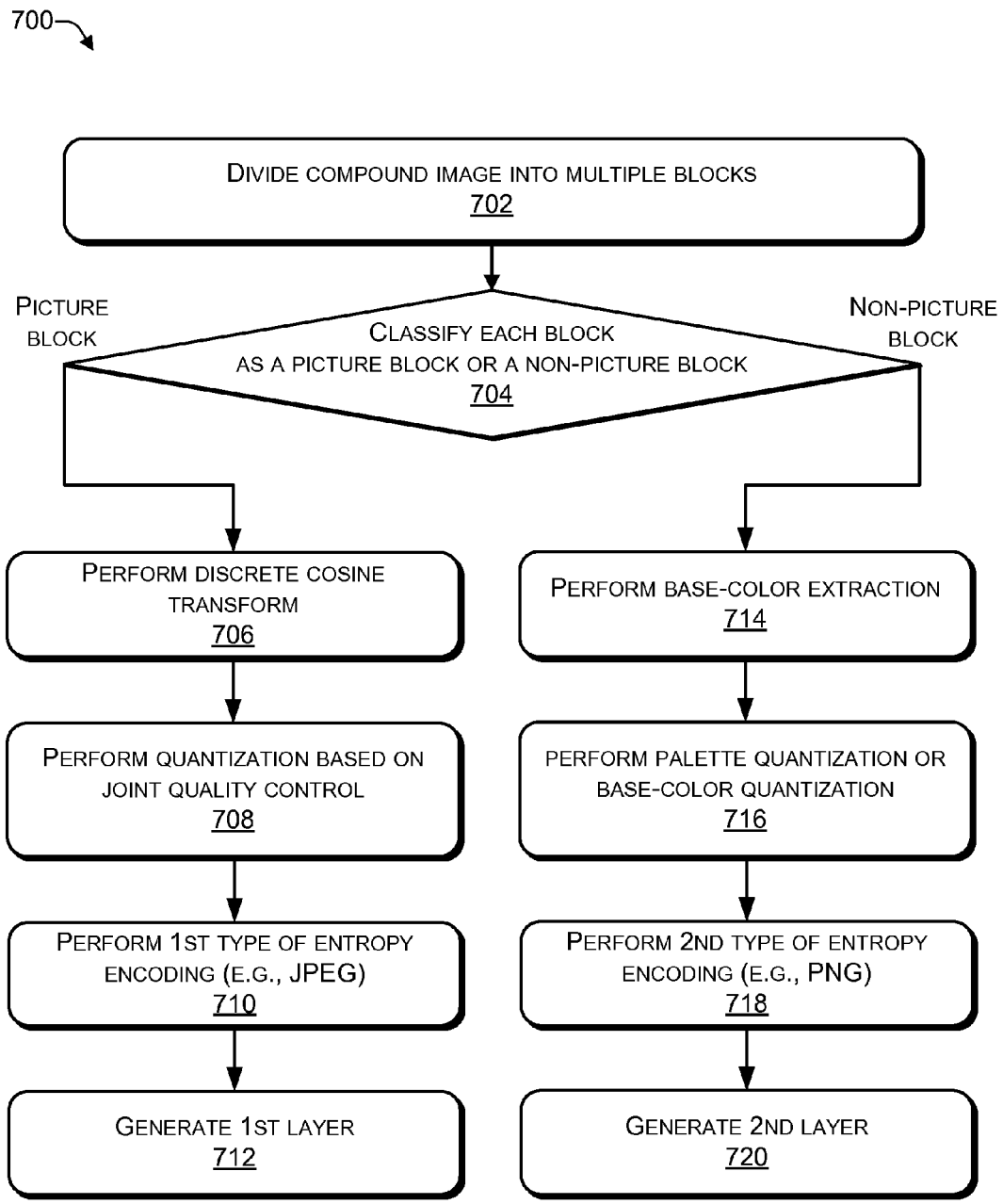
FIG. 7 is a flow diagram of an example process that includes processing picture blocks and non-picture blocks according to some implementations.
Figure 8:
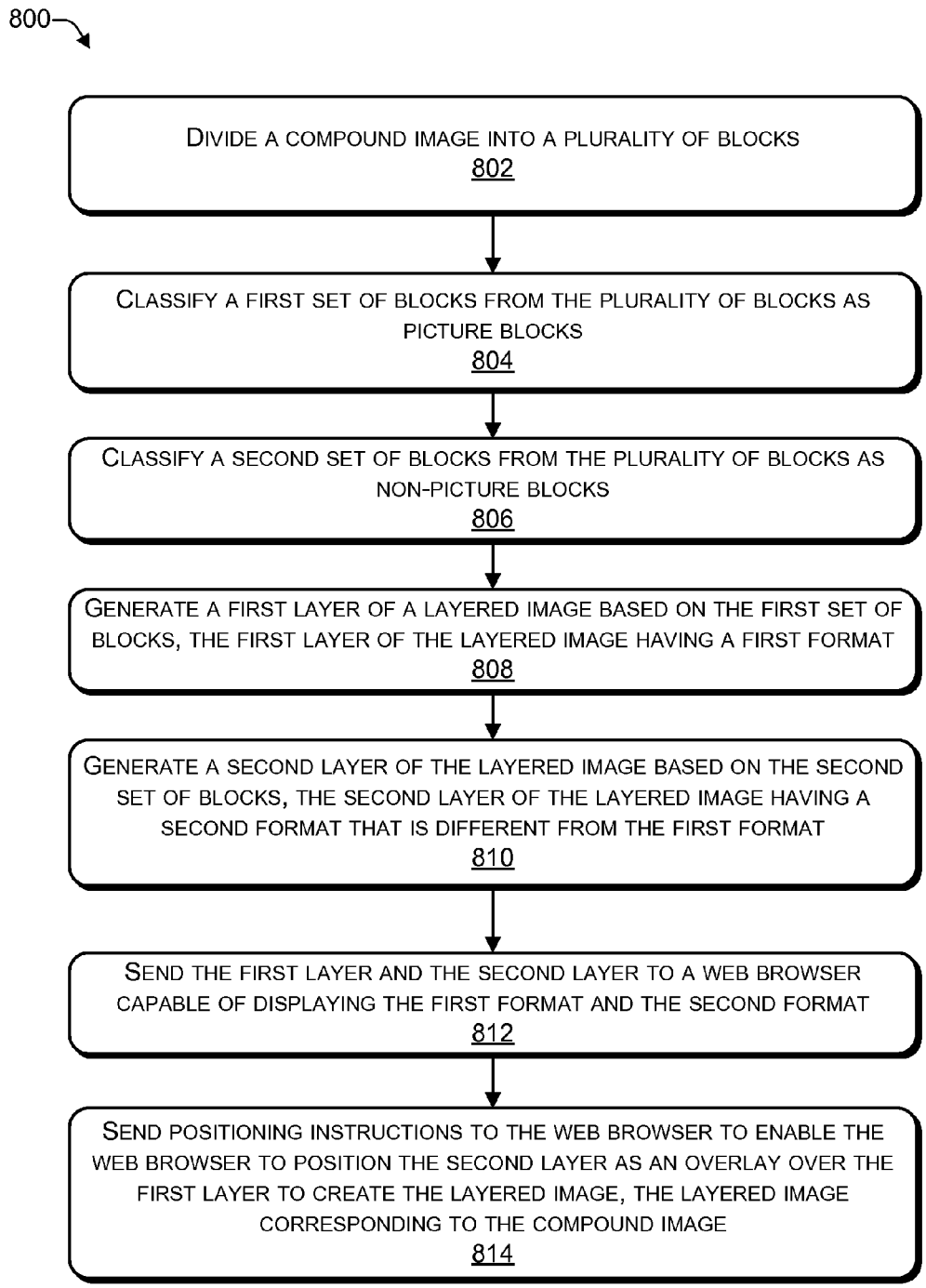
FIG. 8 is a flow diagram of an example process to generate a first layer and a second layer of a layered image according to some implementations.
Figure 9:
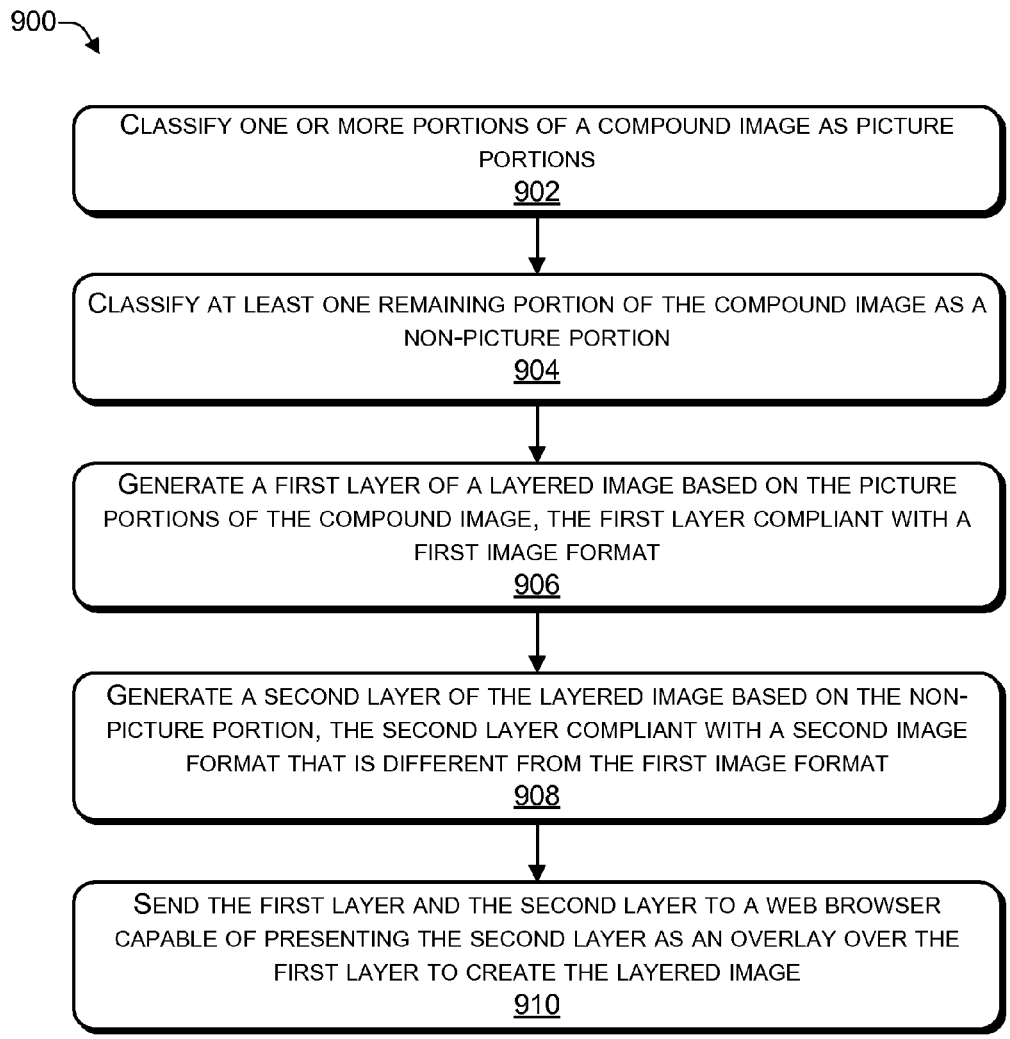
FIG. 9 is a flow diagram of an example process to generate a first layer and a second layer of a layered image according to some implementations.
Figure 10:
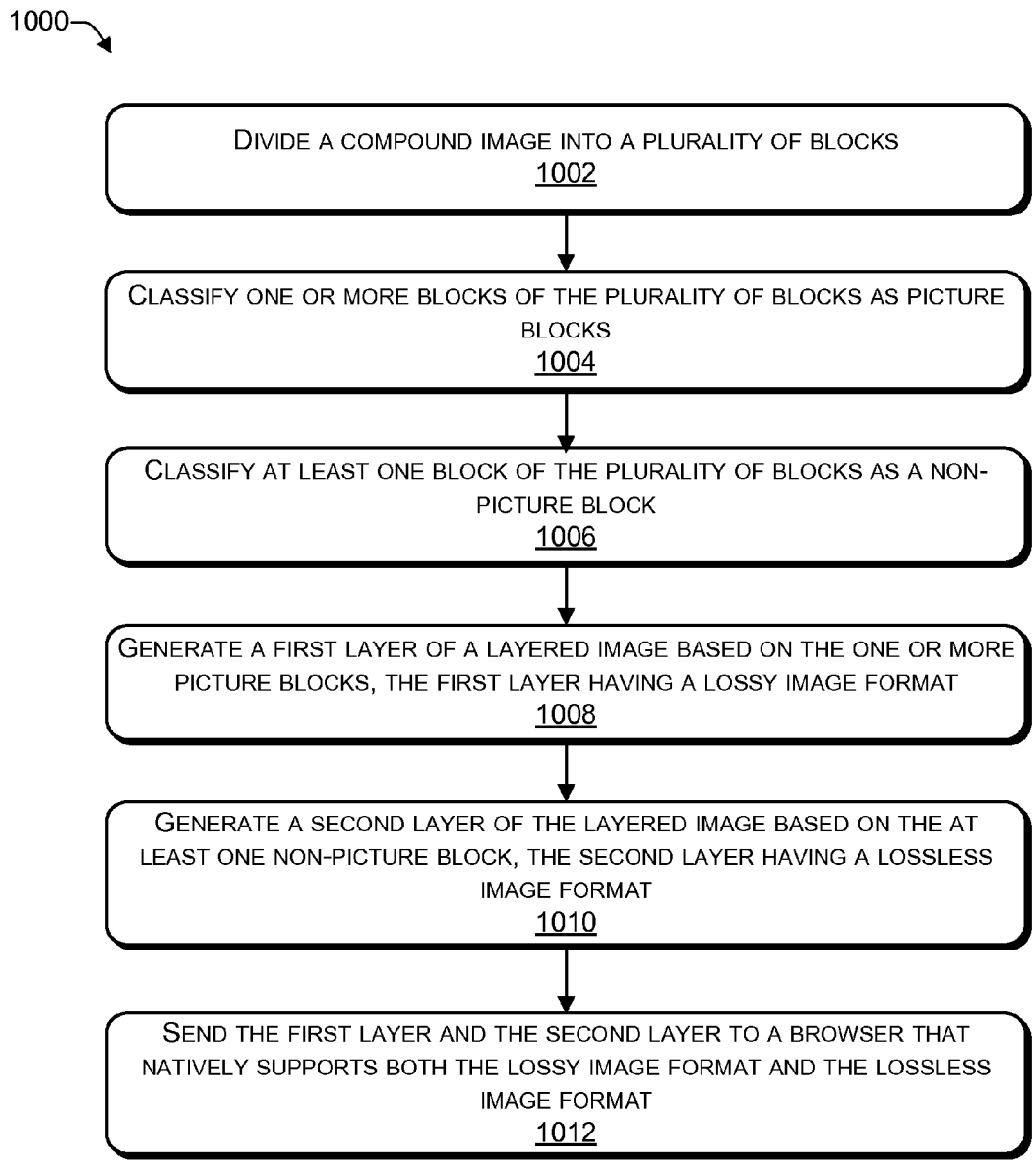
FIG. 10 is a flow diagram of an example process to generate a first layer and a second layer of a layered image according to some implementations.

FIG. 7 is a flow diagram of an example process 700 that includes processing picture blocks and non-picture blocks according to some implementations. FIGS. 8, 9, and 10 are flow diagrams of example processes to generate a first layer and a second layer of a layered image according to some implementations. In the flow diagrams of FIGS. 7, 8, 9, and 10, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 700, 800, 900, and 1000 are described with reference to the frameworks 100 and 200, described above, although other models, frameworks, systems and environments may implement these processes.

At block 702, the framework may divide a compound image into multiple blocks. For example, the framework 200 may divide the compound image 114 into the blocks 202. Each block of the multiple blocks 202 may be no larger than 16×16 pixels.

At block 704, the framework 200 may classify each block as a picture block (e.g., one of the picture blocks 204) or a non-picture block (e.g., one of the non-picture blocks 206). The block may be classified based on a number of base-colors in the block, a pixel gradient distribution in the block, a block boundary smoothness in the block, another block-related statistic, or any combination thereof. In some implementations, equation (1) may be used to classify each block as a picture block or a non-picture block.

At block 706, the framework may perform a discrete cosine transform for a picture block. The discrete cosine transform may be part of the compression technique used by the first layer processing module 110.

At block 708, the framework may perform quantization based on joint quality control. The joint quality control may be used to align the pixel-domain quantization (e.g., the second quantization 216) for non-picture blocks with the discrete cosine transformation-based quantization (e.g., the first quantization 210) for picture blocks. For example, a quantization step used in spatial domain quantization may be mapped to a quality factor in transform domain quantization.

An offline tuning algorithm may be used to pre-determine the rate-distortion optimal mapping from the quality factor to the quantization step as follows.

Let $Q_1, \ldots, Q_l$ represent quality factors, $QS_1, \ldots, QS_n$ represent quantization steps, and let $I_1, \ldots, I_m$ denote images in a training set. Given $Q_i$ for picture blocks, when a quantization step $QS_k$ for textual blocks is applied to an image $I_j$, the resulting rate-distortion (RD) cost may be calculated as follows:

$$C_{i,j,k} = D_{i,j,k} + \lambda_{i,j} R_{i,j,k}, \qquad (3)$$

where $j=1, \ldots, m$, and $k=1, \ldots, n$, where $D_{i,j,k}$ and $R_{i,j,k}$ are the mean square error and the bit rate of textual blocks in $I_j$ respectively, and where $\lambda_{i,j}$ is the Lagrangian factor derived from the slope of the rate-distortion curve of the pictorial blocks in $I_j$ under $Q_i$.

In the training set, each image may be treated as equally important, so given $Q_i$, the rate-distortion cost for each image may be normalized as follows:

$$C'_{i,j,k} = (C_{i,j,k}) / \max_{k=1}^{n}(C_{i,j,k}), \qquad (4)$$

where $j=1, \ldots, m$, and $k=1, \ldots, n$.

The optimal quantization step $QS_k^*$ under $Q_i$ may be determined by minimizing the overall normalized RD cost from all images, as follows:

$$k^* = \operatorname*{argmin}_{k=1}^{n}\left(\sum_{j=1}^{m} C'_{i,j,k}\right). \qquad (5)$$

Based on formula (5), the quantization steps can be calculated and then applied to the codec during the second quantization 216.

At block 710, the framework performs a first type of entropy encoding, such as JPEG format encoding, to the picture block.

At block 712, the framework generates the first layer of a layered image.

At block 714, the framework may perform base-color extraction for the non-picture (e.g., text or graphics) block.

At block 716, the framework may perform palette quantization or base-color quantization. For example, palette quantization may be selected when a bit-rate of the blocks is below a particular threshold or when a user has selected a relatively low quality setting. Base-color quantization may be selected when a bit-rate of the blocks is great than or equal to the particular threshold or when the user has selected a higher quality setting.

At block 718, the framework may perform a second type of entropy encoding, such as PNG format encoding.

At block 720, the framework may generate a second layer of a layered image.

Thus, a compound image may be divided into multiple blocks, and each of the multiple blocks may be classified as a picture block or a non-picture block. The picture blocks may be encoded using a first encoding, such as JPEG, to produce a first layer. The non-picture blocks may be quantized to match the compression of the picture blocks and then encoded using a second encoding, such as PNG, to produce a second layer. The second layer may be overlaid over the first layer to create a layered image representation of the compound image.

FIG. 8 is a flow diagram of an example process 800 to generate a first layer and a second layer of a layered image according to some implementations.

At block 802, a compound image may be divided into a plurality of blocks. For example, the classification module 108 may divide the compound image 114 into the blocks 202.

At block 804, a first set of blocks from the plurality of blocks may be classified as picture blocks. At block 806, a second set of blocks from the plurality of blocks may be classified as non-picture blocks. For example, the classification module 108 may classify a first set of the blocks 202 as the picture blocks 204 and classify a second set of the blocks 202 as the non-picture blocks 206.

At block 808, a first layer of a layered image may be generated based on the first set of blocks. The first layer may have a first format. For example, the first layer processing module 110 may generate the first layer 122 with either a lossy format or a lossless format. In some implementations, the first layer 122 may have a JPEG format.

At block 810, a second layer of a layered image may be generated based on the second set of blocks. The second layer may have a second format that is different from the first format. For example, the second layer processing module 112 may generate the second layer 124 with either a lossy format or a lossless format. In some implementations, the second layer 124 may have a PNG format that is different from the JPEG format of the first layer 122.

At block 812, the first layer and the second layer may be sent to a web browser capable of displaying the first format and the second format. For example, the server 104 may send the first layer 122 and the second layer 124 to the web browser 128 in response to receiving a request for the compound image 114 from the web browser 128. The web browser 128 may be capable of natively displaying the first format (e.g., JPEG) and the second format (e.g., PNG).

At block 814, positioning instructions may be sent to the web browser to enable the web browser to position the second layer as an overlay to the first layer to create the layered image. The layered image may correspond to the compound image. For example, the server 104 may send the positioning instructions 126 to the web browser 128 to enable the web browser 128 to position the transparent regions 132 over the processed picture portions 134 to create the layered image 130. The positioning instructions 126 may be written in a scripting language, such as JavaScript®.

FIG. 9 is a flow diagram of an example process 900 to generate a first layer and a second layer of a layered image according to some implementations.

At block 902, one or more portions of a compound image may be classified as picture portions.

At block 904, at least one remaining portion of the compound image may be classified as a non-picture portion. For example, the classification module 108 may classify the portions 116 and 118 as picture portions and classify the remaining portion 120 of the compound image 114 as the non-picture portion.

At block 906, a first layer of a layered image may be generated based on the picture portions of the compound image. The first layer may be compliant with a first image format. For example, the first layer processing module 110 may generate the first layer 122 based on the picture portions 116 and 118. The first layer 122 may be compliant with the JPEG image format.

At block 908, a second layer of the layered image may be generated based on the non-picture portions of the compound image. The second layer may be compliant with a second image format that is different from the first image format. For example, the second layer processing module 112 may generate the second layer 124 based on the non-picture portion 120. The second layer 122 may be compliant with the PNG image format.

At block 910, the first layer and the second layer may be sent to a web browser capable of presenting the second layer as an overlay to the first layer to create the layered image. For example, the server 104 may send the first layer 122 and the second layer 124 to the web browser 128. The web browser 128 may be capable of presenting the second layer 124 as an overlay to the first layer 122 to create the layered image 130.

FIG. 10 is a flow diagram of an example process 100 to generate a first layer and a second layer of a layered image according to some implementations.

At block 1002, a compound image may be divided into a plurality of blocks. For example, the classification module 108 may divide the compound image 114 into the blocks 202.

At block 1004, one or more blocks of the plurality of blocks may be classified as picture blocks. At block 1006, at least one block of the plurality of blocks may be classified as a non-picture block. For example, the classification module 108 may classify one or more of the blocks 202 as the picture blocks 204 and classify at least one of the blocks 202 as the non-picture blocks 206.

At block 1008, a first layer of a layered image may be generated based on the one or more picture blocks. The first layer may have a lossy image format. For example, the first layer processing module 110 may generate the first layer 122 with a JPEG image format.

At block 1010, a second layer of a layered image may be generated based on the at least one non-picture block. The second layer may have a lossless image format. For example, the second layer processing module 112 may generate the second layer 124 with a PNG image format.

At block 1012, the first layer and the second layer may be sent to a web browser that natively supports both the lossy image format and the lossless image format. For example, the server 104 may send the first layer 122 and the second layer 124 to the web browser 128 in response to receiving a request for the compound image 114 from the web browser 128. The web browser 128 may be capable of natively displaying the lossy image format (e.g., JPEG) and the lossless image format (e.g., PNG).

Example Computing Device and Environment

Figure 11:
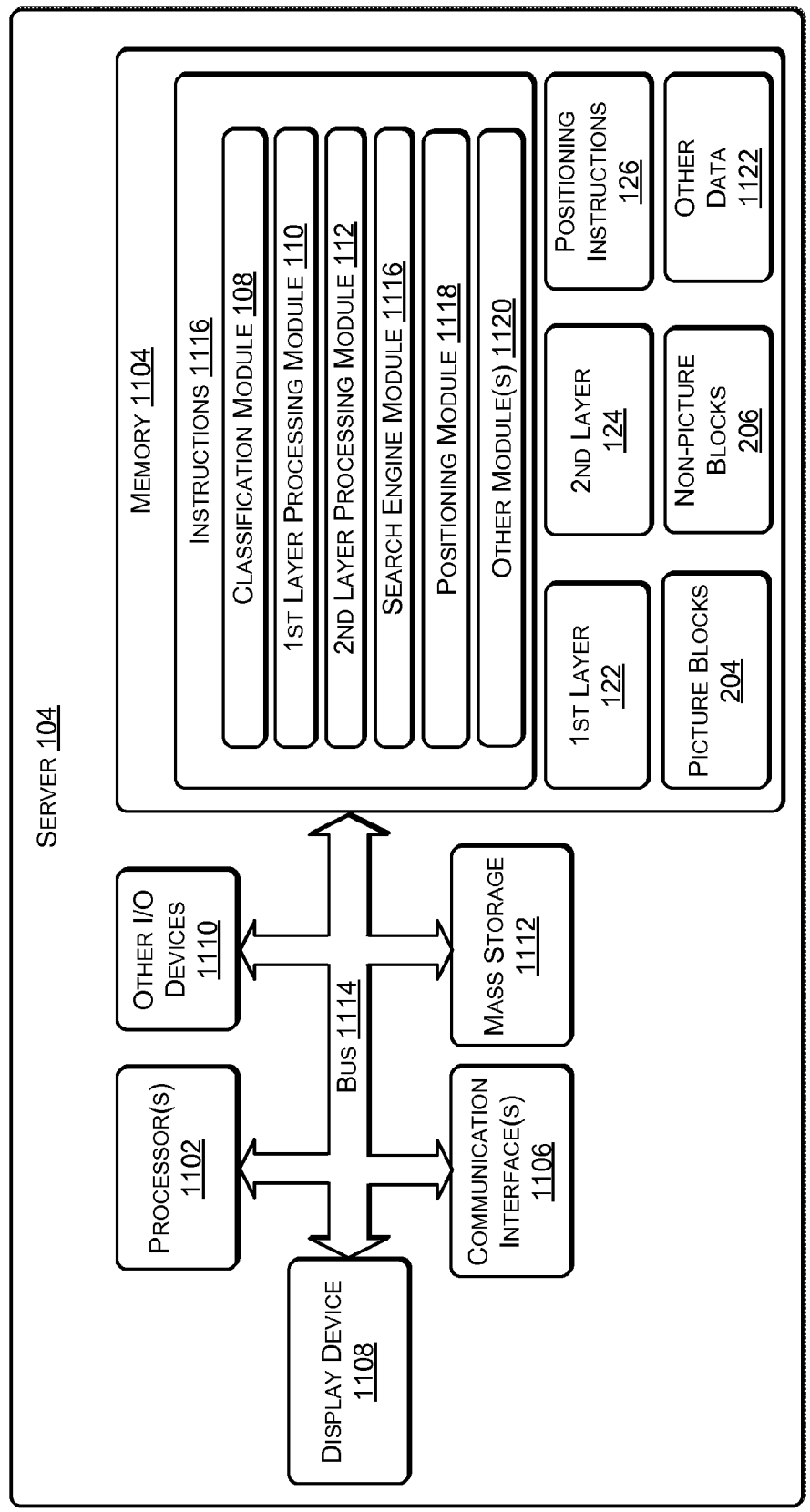
FIG. 11 is a block diagram of an example computing device and environment according to some implementations.

FIG. 11 illustrates an example configuration of the server 104 and environment that can be used to implement the modules and functions described herein. The server 104 may include at least one processor 1102, a memory 1104, communication interfaces 1106, a display device 1108, other input/output (I/O) devices 1110, and one or more mass storage devices 1112, able to communicate with each other, such as via a system bus 1114 or other suitable connection.

The processor 1102 may be a single processing unit or a number of processing units, all of which may include single or multiple computing units or multiple cores. The processor 1102 can be implemented as one or more microprocessors, microcomputers, microcontrollers, digital signal processors, central processing units, state machines, logic circuitries, and/or any devices that manipulate signals based on operational instructions. Among other capabilities, the processor 1102 can be configured to fetch and execute computer-readable instructions stored in the memory 1104, mass storage devices 1112, or other computer-readable media.

Memory 1104 and mass storage devices 1112 are examples of computer storage media for storing instructions which are executed by the processor 1102 to perform the various functions described above. For example, memory 1104 may generally include both volatile memory and non-volatile memory (e.g., RAM, ROM, or the like). Further, mass storage devices 1112 may generally include hard disk drives, solid-state drives, removable media, including external and removable drives, memory cards, flash memory, floppy disks, optical disks (e.g., CD, DVD), a storage array, a network attached storage, a storage area network, or the like. Both memory 1104 and mass storage devices 1112 may be collectively referred to as memory or computer storage media herein, and may be a non-transitory media capable of storing computer-readable, processor-executable program instructions as computer program code that can be executed by the processor 1102 as a particular machine configured for carrying out the operations and functions described in the implementations herein.

The server 104 may also include one or more communication interfaces 1106 for exchanging data with other devices, such as via a network, direct connection, or the like, as discussed above. The communication interfaces 1106 can facilitate communications within a wide variety of networks and protocol types, including wired networks (e.g., LAN, cable, etc.) and wireless networks (e.g., WLAN, cellular, satellite, etc.), the Internet and the like. Communication interfaces 1106 can also provide communication with external storage (not shown), such as in a storage array, network attached storage, storage area network, or the like.

A display device 1108, such as a monitor may be included in some implementations for displaying information and images to users. Other I/O devices 1110 may be devices that receive various inputs from a user and provide various outputs to the user, and may include a keyboard, a remote controller, a mouse, a printer, audio input/output devices, and so forth.

Memory 1104 may include modules and components for generating a first layer and a second layer according to the implementations herein. In the illustrated example, memory 1104 includes instructions 1116, such as the classification module 108, the first layer processing module 110, the second layer processing module 112, a search engine module 1116, and a positioning module 1118. The search engine module 1116 may provide search engine functionality to the web browser 128. For example, the search engine module 1116 may identify one or more compound images in response to receiving a search request from the web browser 128. The server 104 may compress the compound images using the modules 110 and 112. The server 104 may send a first layer and a second layer corresponding to each compound image to the web browser 128. The positioning module 1118 may determine the positioning instructions 126.

Memory 1104 may also include other data and data structures described herein, such as the the first layer 122, the second layer 124, the positioning instructions 126, the picture blocks 204, the non-picture blocks 206, and other data 1122. Memory 1104 may further include one or more other modules 1120, such as an operating system, drivers, communication software, or the like. Memory 1104 may also include other data 1122, such as data stored while performing the functions described above and data used by the other modules 1120.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Although illustrated in FIG. 11 as being stored in memory 1104 of the server 104, the modules 108, 110, 112, 1116, 1118, and 1120, or portions thereof, may be implemented using any form of computer-readable media that is accessible by the server 104. As used herein, "computer-readable media" includes, at least, two types of computer-readable media, namely computer storage media and communications media.

Computer storage media includes volatile and non-volatile, removable and non-removable media implemented in any method or technology for storage of information, such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

CONCLUSION

Although the subject matter has been described in language specific to structural features and/or methodological acts, the subject matter defined in the appended claims is not limited to the specific features or acts described above. Rather, the specific features and acts described above are disclosed as example forms of implementing the claims. This disclosure is intended to cover any and all adaptations or variations of the disclosed implementations, and the following claims should not be construed to be limited to the specific implementations disclosed in the specification. Instead, the scope of this document is to be determined entirely by the following claims, along with the full range of equivalents to which such claims are entitled.

The invention claimed is:

1. A method under control of one or more processors configured with executable instructions, the method comprising:
dividing a compound image into a plurality of blocks, the compound image including one or more picture portions and at least one non-picture portion;
identifying base-colors in the plurality of blocks;
determining a number of pixels in each block of the plurality of blocks that are covered by one of the base-colors;
determining a distribution of pixel gradients in each block of the plurality of blocks;
determining a block boundary smoothness for each block of the plurality of blocks;
based on the number of pixels in each block that are covered by one of the base-colors, the distribution of pixel gradients in each block, and the block boundary smoothness for each block, classifying a first set of blocks from the plurality of blocks as picture blocks associated with at least a part of the one or more picture portions and classifying a second set of blocks from the plurality of blocks as non-picture blocks associated with at least a part of the at least one non-picture portion;
generating a first layer of a layered image based on the first set of blocks, the first layer of the layered image having a first format; and
generating a second layer of the layered image based on the second set of blocks, the second layer of the layered image having a second format that is different from the first format, the first format and the second format supported by at least one type of web browser.

2. The method of claim 1, further comprising sending positioning instructions to the web browser to enable the web browser to position the second layer as an overlay to the first layer to create the layered image, the layered image corresponding to the compound image.

3. The method of claim 1, wherein the second layer includes one or more transparent regions corresponding to at least one of the plurality picture blocks.

4. The method of claim 1, wherein the first format is compliant with a joint photographic experts group (JPEG) standard.

5. The method of claim 1, wherein the second format is compliant with a portable network graphics (PNG) standard.

6. The method of claim 1, wherein the at least one non-picture portion of the compound image has a higher contrast than the one or more picture portions of the compound image.

7. The method of claim 1, wherein the non-picture portion comprises at least one of text, computer-generated graphics, or line art.

8. The method of claim 1, wherein the first format and the second format are supported by the at least one type of web browser without installation of an external coder/decoder (codec).

9. The method of claim 1, wherein each block of the plurality of blocks has a length not greater than sixteen pixels and a width not greater than sixteen pixels.

10. The method of claim 9, wherein generating the first layer of the layered image comprises:
performing a discrete cosine transformation of the pixels in each block of the first set of blocks to create transformed pixels;
quantizing the transformed pixels to create first quantized pixels; and
performing a first type of entropy encoding on the first quantized pixels to generate the first layer of the layered image.

11. The method of claim 9, wherein generating the second layer of the layered image comprises:
quantizing the pixels in each block of the second set of blocks to create second quantized pixels; and
performing a second type of entropy encoding on the second quantized pixels to generate the second layer of the layered image.

12. The method of claim 11, wherein quantizing the pixels in each block of the second set of blocks to create the second quantized pixels comprises:
determining a quality level associated with the layered image;
in response to determining that the quality level satisfies a predetermined threshold, quantizing the pixels in each block of the second set of blocks via palette quantization; and
in response to determining that the quality level does not satisfy the predetermined threshold, quantizing the pixels in each block of the second set of blocks via base-color quantization.

13. Computer-readable storage media including instructions executable by one or more processors to perform operations comprising:
dividing a compound image into a plurality of blocks;
identifying base-colors in the plurality of blocks;
determining a number of pixels in each block of the plurality of blocks that are covered by one of the base-colors;
determining a distribution of pixel gradients in each block of the plurality of blocks;
determining a block boundary smoothness for each block of the plurality of blocks;
based on the number of pixels in each block that are covered by one of the base-colors, the distribution of pixel gradients in each block, and the block boundary smoothness for each block, classifying one or more portions of a compound image as picture portions and classifying at least one remaining portion of the compound image as a non-picture portion;
generating a first layer of a layered image based on the picture portions of the compound image, the first layer compliant with a first image format;
generating a second layer of the layered image based on the non-picture portion, the second layer compliant with a second image format that is different from the first image format; and
sending the first layer and the second layer to a web browser.

14. The computer-readable storage media of claim 13, wherein the second layer includes transparent portions that correspond to the picture portions of the compound image to enable viewing of the picture portions.

15. The computer-readable storage media of claim 13, wherein the first image format is a lossy image format and wherein the second image format is a lossless image format.

16. The computer-readable storage media of claim 15, wherein the web browser is capable of displaying the lossy image format and the lossless image format without installation of an add-on coder/decoder (codec).

17. A computing device comprising:
one or more processors in communication with computer-readable storage media;

a classification module maintained on the computer-readable storage media and executable by the one or more processors to:
    divide a compound image into a plurality of blocks,
    identify base-colors in the plurality of blocks,
    determine a number of pixels in each block of the plurality of blocks that are covered by one of the base-colors,
    determine a distribution of pixel gradients in each block of the plurality of blocks,
    determine a block boundary smoothness for each block of the plurality of blocks, and
    based on the number of pixels in each block that are covered by one of the base-colors, the distribution of pixel gradients in each block, and the block boundary smoothness for each block, classify one or more blocks of the plurality of blocks as picture blocks, and classify at least one block of the plurality of blocks as a non-picture block;
a first layer processing module maintained on the computer-readable storage media and executable by the one or more processors to generate a first layer of a layered image based on the one or more picture blocks, the first layer having a lossy image format; and
a second layer processing module maintained on the computer-readable storage media and executable by the one or more processors to generate a second layer of the layered image based on the at least one non-picture block, the second layer having one of a lossless image format and another lossy image format, the first layer and the second layer being supported by at least one type of web browser.

18. The computing device of claim 17, further comprising a positioning module to generate positioning instructions to be sent via a communication interface of the computing device with the first layer and the second layer, the positioning instructions instructing a web browser to position the second layer as an overlay to the first layer to create the layered image.

19. The computing device of claim 17, wherein the layered image has a smaller size than the compound image.

20. The computing device of claim 17, wherein the second layer includes one or more transparent regions corresponding to the picture blocks.

* * * * *